(12) United States Patent  (10) Patent No.: US 11,054,271 B2
Viswanathan  (45) Date of Patent: Jul. 6, 2021

(54) METHOD AND APPARATUS FOR ALIGNING DRIVE SEGMENTS BASED ON USER INPUTS

(71) Applicant: HERE GLOBAL B.V., Eindhoven (NL)

(72) Inventor: Anirudh Viswanathan, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 160 days.

(21) Appl. No.: 16/209,570

(22) Filed: Dec. 4, 2018

(65) Prior Publication Data

US 2020/0173805 A1 Jun. 4, 2020

(51) Int. Cl.
  *G01C 21/36* (2006.01)
  *G01C 21/34* (2006.01)
(52) U.S. Cl.
  CPC ..... *G01C 21/3617* (2013.01); *G01C 21/3484* (2013.01); *G01C 21/3641* (2013.01)
(58) Field of Classification Search
  CPC ............ G01C 21/3617; G01C 21/3484; G01C 21/3641; G01C 21/32
  See application file for complete search history.

(56) References Cited

U.S. PATENT DOCUMENTS

| 6,628,821 B1 | 9/2003 | Covell et al. |
| 2017/0337682 A1 | 11/2017 | Liao et al. |
| 2018/0024568 A1* | 1/2018 | Fridman ............... G05D 1/0246 701/28 |

OTHER PUBLICATIONS

Steinke et al., "Learning Dense 3d Correspondence," retrieved on Aug. 23, 2018 from http://papers.nips.cc/paper/2957-learning-dense-3d-correspondence.pdf, 8 pages.
Creusot et al., "A Machine-learning Approach to Keypoint Detection and Landmarking on 3d Meshes," published in International Journal of Computer Vision, Mar. 2013, vol. 102, Issue 1-3, pp. 146-179.
Suwajanakorn et al., "Discovery of Semantic 3d Keypoints via End-to-end Geometric Reasoning," Jul. 5, 2018, retrieved from http://www.cs.toronto.edu/~norouzi/research/papers/keypoints.pdf, pp. 1-13.

* cited by examiner

*Primary Examiner* — Brian P Sweeney
(74) *Attorney, Agent, or Firm* — Ditthavong, Steiner & Mlotkowski

(57) ABSTRACT

An approach is provided for aligning one or more drive segments based on a consensus set of user defined inputs. The approach involves, for example, retrieving manual drive alignment data collected from a plurality of human users, wherein the manual drive alignment data indicates one or more regions of at least two drive data segments selected by the human users to align the at least two drive segments. The approach also involves processing the manual drive alignment data to determine a set of common drive alignment locations of the one or more regions. The approach further involves processing a plurality of subsequent drive segments to automatically align the plurality of subsequent drive segments based on the set of common drive alignment locations.

20 Claims, 11 Drawing Sheets

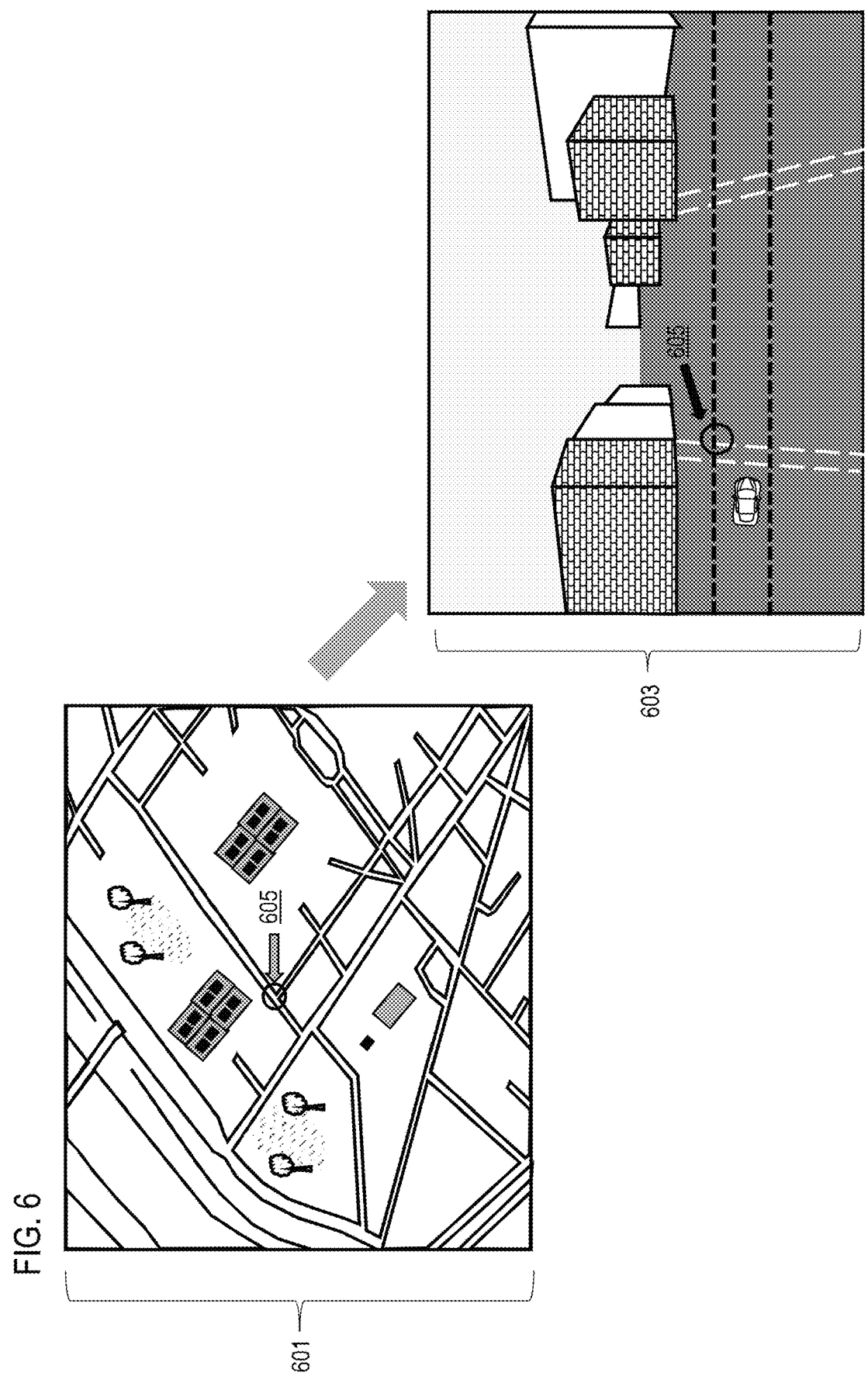

METHOD AND APPARATUS FOR ALIGNING DRIVE SEGMENTS BASED ON USER INPUTS

BACKGROUND

Modern location-based services and applications, e.g., autonomous driving, are increasingly demanding highly accurate and detailed digital map data, e.g., centimeter-level accuracy or better, across wide geographic areas. To achieve such levels of coverage, map service providers have relied on data, e.g., imagery, collected from a variety of sources, e.g., aerial cameras, ground-level cameras, etc. However, when images for a particular region is captured multiple times by the variety of sources, local errors specific to each capture session can result in misalignment of data relative to other capture sessions. Accordingly, map service providers face significant technical challenges in providing highly accurate digital map data.

SOME EXAMPLE EMBODIMENTS

Therefore, there is a need for an approach for aligning one or more drive segments based on a consensus set of user defined inputs.

According to one embodiment, a method for aligning drive segments comprises retrieving manual drive alignment data collected from a plurality of human users, wherein the manual drive alignment data indicates one or more regions of at least two drive data segments selected by the human users to align the at least two drive segments. The method also comprises processing the manual drive alignment data to determine a set of common drive alignment locations of the one or more regions. The method further comprises processing a plurality of subsequent drive segments to automatically align the plurality of subsequent drive segments based on the set of common drive alignment locations.

According to another embodiment, an apparatus for aligning drive segments comprises at least one processor, and at least one memory including computer program code for one or more computer programs, the at least one memory and the computer program code configured to, with the at least one processor, cause, at least in part, the apparatus to retrieve manual drive alignment data collected from a plurality of human users, wherein the manual drive alignment data indicates one or more regions of at least two drive data segments selected by the human users to align the at least two drive segments. The apparatus is also caused to process the manual drive alignment data to determine a set of common drive alignment locations of the one or more regions. The apparatus is further caused to process a plurality of subsequent drive segments to automatically align the plurality of subsequent drive segments based on the set of common drive alignment locations.

According to another embodiment, a non-transitory computer-readable storage medium for aligning drive segments carries one or more sequences of one or more instructions which, when executed by one or more processors, cause, at least in part, an apparatus to retrieve manual drive alignment data collected from a plurality of human users, wherein the manual drive alignment data indicates one or more regions of at least two drive data segments selected by the human users to align the at least two drive segments. The apparatus is also caused to process the manual drive alignment data to determine a set of common drive alignment locations of the one or more regions. The apparatus is further caused to process a plurality of subsequent drive segments to automatically align the plurality of subsequent drive segments based on the set of common drive alignment locations.

According to another embodiment, an apparatus comprises means for retrieving manual drive alignment data collected from a plurality of human users, wherein the manual drive alignment data indicates one or more regions of at least two drive data segments selected by the human users to align the at least two drive segments. The apparatus also comprises means for processing the manual drive alignment data to determine a set of common drive alignment locations of the one or more regions. The apparatus further comprises means for processing a plurality of subsequent drive segments to automatically align the plurality of subsequent drive segments based on the set of common drive alignment locations.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a diagram illustrating example image data from different sources depicting the same feature, according to one embodiment;

DESCRIPTION OF SOME EMBODIMENTS

Examples of a method, apparatus, and computer program for aligning one or more drive segments based on a consensus set of user defined inputs are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
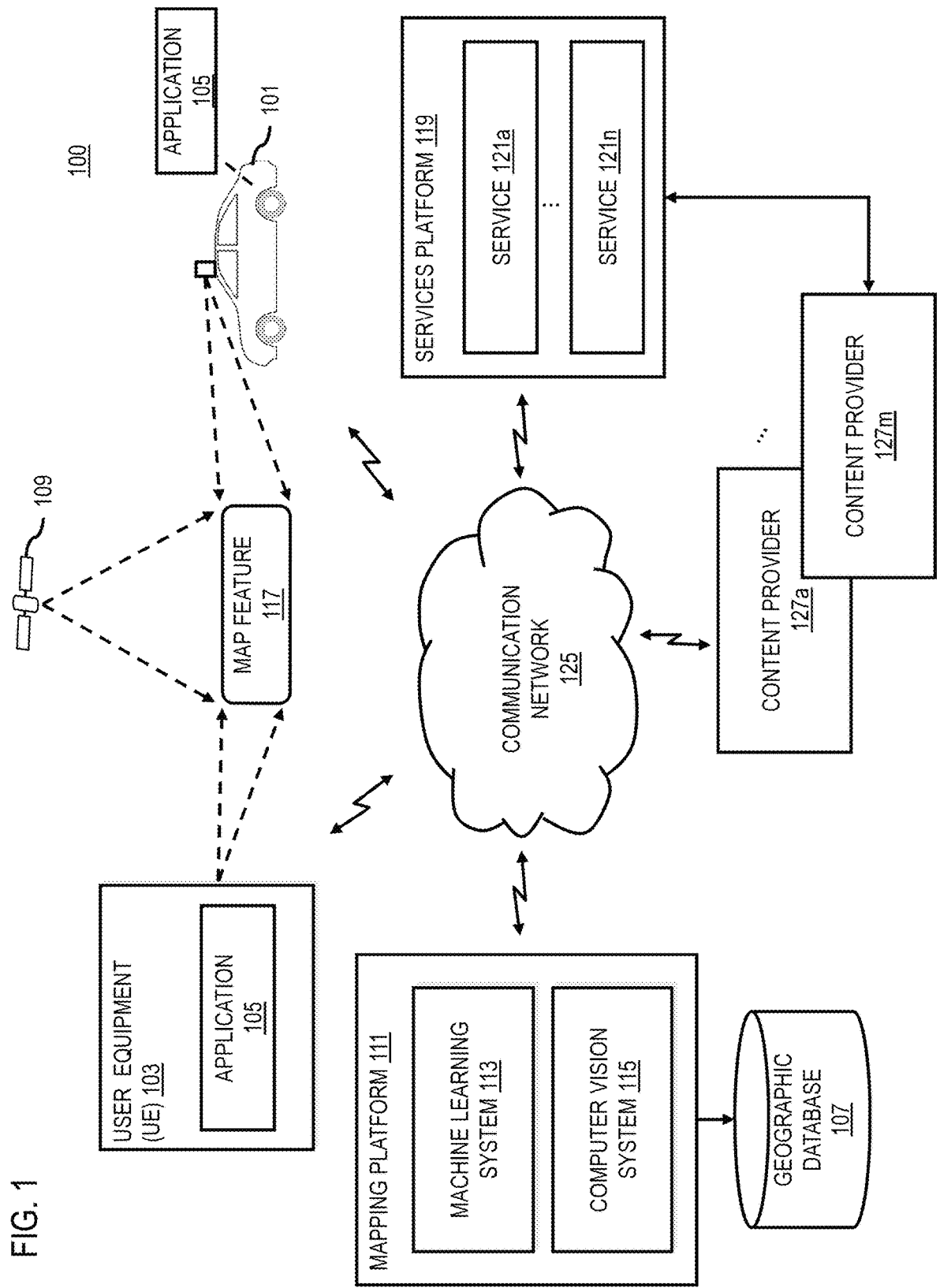
FIG. 1 is a diagram of a system capable of aligning one or more drive segments based on a consensus set of user defined inputs, according to one example embodiment.

FIG. 1 is a diagram of a system capable of aligning one or more drive segments based on a consensus set of user defined inputs, according to one example embodiment. The current state of technology to perform a drive segment alignment is either completely human-centric or fully automated. In a human-centric drive segment alignment, the users are asked to select corresponding regions in two or more different drives. Once common regions are selected, a spline fitting algorithm or a curve fitting technique is implemented to register one drive segment relative to another. While the human-centric approach facilitates most accurate alignment, the scalability is limited. On the other hand, a fully-automated drive alignment technique relies on a feature-based method to perform the alignment, e.g., a representation of environment features that make the alignment possible. The environmental features are predefined, e.g., gradients of the road that follow certain pre-defined patterns. However, the environmental features are sparse in certain regions of the map and/or may lack context that a human user recognizes during a manual alignment process. Furthermore, when data for a certain region is captured numerous times, local errors, specific to each capture session can lead to misalignment of the data relative to the other capture sessions.

To address this problem, system 100 of FIG. 1 introduces the capability to align one or more drive segments based on a consensus set of user defined inputs. System 100 relates to localization or vehicle positioning of autonomous vehicles, especially in the context of map alignment along multiple drive segments. As discussed above, a human-centric approach is expensive and does not scale, while a fully automated technique lacks context to perform the alignment where feature-correspondence is sparse. As a result, a machine learning process is required to automate the alignment process by learning from human users in the loop, who performs the manual alignment, e.g., learning to localize.

In one embodiment, system 100 implements a machine learning approach to determine context based priors, e.g., relevant contextual information, defined by human users for an alignment of drive segments. In one example embodiment, every time a user clicks a location of a point (or region) of interest to identify corresponding points across the drive segment, e.g., during a manual alignment process, system 100 stores the location in geographic database 107 or a memory (not shown for illustrative convenience). Subsequently, system 100 clusters the locations for all users to learn a consensus set, e.g., stable regions across the users. Thereafter, system 100 stores the consensus set in geographic database 107 or the memory. Thereafter, system 100 compares any new pair of drives that need to be aligned to the consensus set, and regions in the drive that corresponds to visually similar locations of the consensus set are used as points of correspondence between the drives. Then, system 100 aligns the new pair of drives to match the consensus set.

In system 100, vehicle 101 is any vehicles, e.g., an autonomous vehicle, equipped with a variety of sensors including but not limited to location sensors, e.g., configured to process signals from positioning satellites 109, e.g., a Global Positioning System (GPS) satellite, and other sensors, e.g., camera sensor, LiDAR sensor, RADAR sensor, etc., to assist in correctly localizing vehicle 101 on map 117. In one embodiment, accurate determination of vehicle 101's location on the map enables planning of a route, both on fine and coarse scales. On a coarse scale, navigation maps, e.g., a digital map provided from geographic database 107, allow vehicles 101 to know what roads to use to reach a particular destination. However, on a finer scale, digital maps allow vehicles 101 to know what lanes to be in and when to make lane changes, e.g., lane-level localization.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with the vehicle 101 or be a component part of the vehicle 101.

In one embodiment, the UE 103 and/or vehicle 101 may execute a software application 105 to capture image data or other observation data for determining feature correspondence or using feature correspondence according the embodiments described herein. By way of example, the application 105 may also be any type of application that is executable on the UE 103 and/or vehicle 101, such as autonomous driving applications, mapping applications, location-based service applications, navigation applications, content provisioning services, camera/imaging application, media player applications, social networking applications, calendar applications, and the like. In one embodiment, the application 105 may act as a client for the mapping platform 111 and perform one or more functions associated with generating feature correspondence from different image views alone or in combination with the machine learning system 113.

In one embodiment, UE 103 and/or vehicle 101 are configured with various sensors for generating or collecting environmental image data, e.g., for processing by mapping platform 111, related geographic data, etc. In one embodiment, the sensed data represent sensor data associated with a geographic location or coordinates at which the sensor data was collected. By way of example, the sensors may include a global positioning sensor for gathering location data, e.g., GPS, a network detection sensor for detecting wireless signals or receivers for different short-range communications, e.g., Bluetooth, Wi-Fi, Li-Fi, near field communication (NFC) etc., temporal information sensors, a camera/imaging sensor for gathering image data, e.g., the camera sensors may automatically capture ground control point imagery, etc. for analysis, an audio recorder for gathering audio data, velocity sensors mounted on steering wheels of the vehicles, switch sensors for determining whether one or more vehicle switches are engaged, and the like.

In one embodiment, mapping platform 111 may be a platform with multiple interconnected components. The mapping platform 111 may include multiple servers, intelligent networking devices, computing devices, components and corresponding software for aligning one or more drive segments based on a consensus set of user defined inputs. Though depicted as separate entity in FIG. 1, it is contemplated that mapping platform 111 may be implemented as a module of any of the components of system 100, e.g., vehicle 101, UE 103, services platform 119, any of services 121a-121n of services platform 119, etc. The functions of mapping platform 111 are discussed with respect to FIGS. 2-8 below.

In one embodiment, mapping platform 111 processes manual drive alignment data collected from a plurality of human users to determine a set of common drive alignment locations, e.g., a consensus set. The set of common drive alignment locations are used as a learned context-based priors for the aligning of subsequent drive segments. Thereafter, mapping platform 111 automatically aligns subsequent drive segments based on the set of common drive alignment locations. In one embodiment, mapping platform 111 may determine 3D coordinates by triangulating features in imagery from areas with high fidelity pose data to align subsequent drive segments. In one example embodiment, these areas can be areas where specialized mapping vehicles are equipped with cameras and other specialized sensors, e.g., LiDAR, radar, high-accuracy GPS receivers, etc., that can achieve submeter levels of location accuracy. These vehicles would then generate high accuracy ground level imagery, e.g., high quality can refer to submeter accuracy or any other designated accuracy level, that can be queried from geographic database 107. The refined camera models are then used to triangulate 3D positions of photo-identifiable points in areas with low fidelity pose data. For example, ground level feature correspondences for the resulting imagery, e.g., dash cam imagery from the specialized mapping vehicles, can then be used in combination with associated dash camera pose information to triangulate the 3D locations of various photo-identifiable features or points in the ground level imagery with high accuracy. These image-to-image and image-to-ground correspondences are used as constraints in a bundle adjustment of the perspective camera models. Such drive alignment guarantees accurate imagery, and when road features are derived from this imagery, their positions are more accurate enabling better localization and safety of the vehicle.

In one embodiment, communication network 125 of system 100 includes one or more networks such as a data network, a wireless network, a telephony network, or any combination thereof. It is contemplated that the data network may be any local area network (LAN), metropolitan area network (MAN), wide area network (WAN), a public data network, e.g., the Internet, short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, mapping platform 111 has connectivity over a communication network 125 to services platform 119, e.g., an OEM platform, that provides one or more services 121, e.g., sensor data collection services. By way of example, services 121 may also be other third-party services and include mapping services, navigation services, travel planning services, notification services, social networking services, content, e.g., audio, video, images, etc., provisioning services, application services, storage services, contextual information determination services, semantic information determination services, location-based services, information-based services, e.g., weather, news, etc. In one embodiment, services platform 119 uses the output, e.g. contextual information priors, of machine learning system 113 to provide services such as navigation, mapping, other location-based services, etc.

In one embodiment, content providers 127a-127m (collectively referred to as content providers 127) may provide content or data, e.g., including geographic data, parametric representations of mapped features, sensor data, image data, map data, contextual information, semantic information, etc., to geographic database 107, mapping platform 111, services platform 119, services 121, and vehicle 101. The content provided may be any type of content, such as image content, map content, textual content, audio content, video content, etc. In one embodiment, content providers 127 may provide content that may aid in aligning one or more drive segments based on a consensus set of user defined inputs. In one embodiment, content providers 127 may also store content associated with geographic database 107, mapping platform 111, services platform 119, services 121, UE 103, and/or vehicle 101. In another embodiment, content providers 127 may manage access to a central repository of data and offer a consistent, standard interface to data, such as a repository of the geographic database 107.

By way of example, mapping platform 111, services platform 119, services 121, vehicle 101, UE 103, and/or content providers 127 communicate with each other and other components of the communication network 125 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
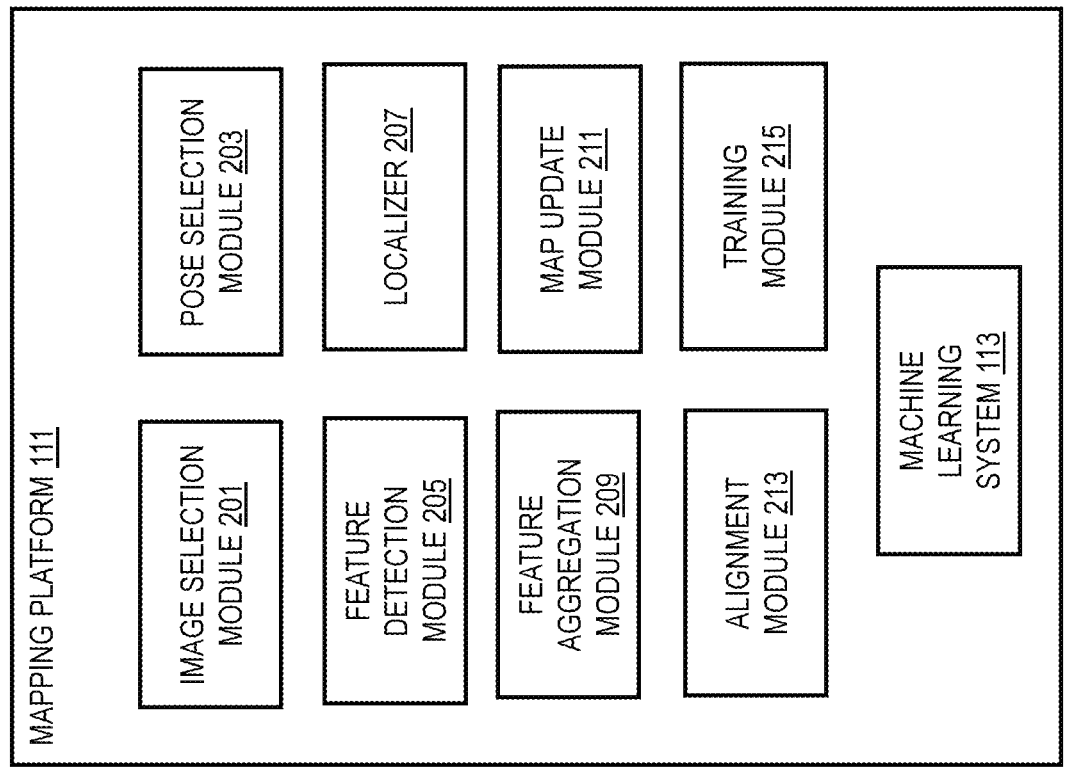
FIG. 2 is a diagram of the components of mapping platform 111, according to one example embodiment.

FIG. 2 is a diagram of the components of mapping platform 111, according to one example embodiment. By way of example, mapping platform 111 includes one or more components for aligning one or more drive segments based on a consensus set of user defined inputs. It is contemplated that the functions of these components may be combined in one or more components or performed by other components of equivalent functionality. In this embodiment, mapping platform 111 includes image selection module 201, pose selection module 203, feature detection module 205, localizer 207, feature aggregation module 209, map update module 211, alignment module 213, training module 215, and machine learning system 113. In another embodiment, one or more of modules 201-215 may be implemented as a cloud-based service, local service, native application, or a combination thereof. The above presented modules and components of the mapping platform 111 can be implemented in hardware, firmware, software, or a combination thereof.

In one embodiment, image selection module 201 retrieves a top down image for or otherwise depicting an area of interest. A top image can be captured by satellite 109 or other aerial vehicle or platform, e.g., airplanes, drones, etc. Generally, top down imagery is captured at a relatively high height, e.g., thousands of feet to miles above the surface of the Earth. As a result, top imagery can cover a large geographic area, e.g., many square kilometers or more, making such imagery particularly applicable to large-scale mapping. While satellite or other top down imagery can have relatively high accuracy location measurements, the large coverage areas may make it difficult to achieve sub-meter accuracy needed for some location-based applications or services, e.g., autonomous driving. In another embodiment, image selection module 201 retrieves ground-level imagery captured by mapping vehicles with high accuracy location sensors. Accordingly, correcting the top down imagery using higher accuracy image data from mapping vehicles can provide for increased location accuracy.

In one embodiment, pose selection module 203, determines a ground level camera pose path for an area of interest. For example, pose selection module 203 can retrieve the top down imagery from geographic database 107, an imagery database, or other equivalent databases. The top down image can also have metadata indicating the geographic area, e.g., the area of interest, depicted in the top image, or pose selection module 203 can otherwise determine the corresponding coverage area using any other process, e.g., by feature detection and matching against known features. Based on this coverage area/area of interest determined for the top down imagery, pose selection module 203 can query the image data, geographic database 107, or equivalent database for ground level camera pose trajectories that fall within the area depicted in the top image. In one embodiment, the ground level camera pose path is based on sensor data indicating a trajectory of a ground level camera traveling through the area of interest and a view direction of the ground level camera. For example, the trajectory is based on a drive path of a vehicle on which the ground level camera is mounted and can be recorded as a time-ordered sequence of probe points, e.g., a sequence of sensor-measured locations and headings of the camera or vehicle.

In one embodiment, feature detection module 205 selects a portion of the top down image that corresponds to a geographic area within a distance threshold from the ground level camera pose path. For example, in FIG. 5, feature detection module 205 can translate a real-world distance threshold, e.g., 50 meters, from the longitudinal axis of trajectory 501 into a pixel coordinates of the top down image, and then select that portion of the top down image that includes the pixels corresponding to area from trajectory 501 that is within the distance threshold. Feature detection module 205 then processes that portion of the top down image to identify one or more semantic features. In this way, feature detection module 205 need not process the entire image to identify features but can advantageously narrow the focus of the processing to just the determined portion of the top image. This can lead to advantageous reduction of the computing resources that would otherwise be needed to process the entire image.

In one embodiment, feature detection module 205 can detect any map feature that is visible in both top down and ground level imagery (or imagery from any perspectives or views of interest). Feature detection module 205 can use, for instance, computer vision system 115 in combination with machine learning system 113 (or equivalent) to recognize the pixels of the images that correspond to the visible feature. For example, in one embodiment, the identified feature or features can include but are not limited to intersection-related features which are generally visible in both top down and ground level images. While any type of visible or photo-identifiable features can be used according to the embodiments described herein, intersection-related features, e.g., curvilinear geometry intersection features, are particularly suited for automated identification, e.g., via the computer vision system 115, because they exhibit the following properties: (1) have a consistent definition, (2) are uniquely identifiable, (3) have spatial sparsity, and/or (4) are generalizable across different geographic regions.

In one embodiment, localizer 207 translates the sensed geographic coordinates for the detected features indicated in a sensor data, e.g., image data and/or map feature observation reports to specific locations represented in the digital map data. The detected feature can be any mappable feature of a geographic area including, but not limited to, road signs, road furniture, lane markings, nodes, links, etc. and/or any characteristics/attributes thereof. By way of example, localizer 207 can use any localization algorithm or process to register sensor data or reported feature observations to the digital map to determine location data, e.g., geographic coordinates, associated road links/nodes, etc., for the detected features. The localization algorithm, for instance, searches over several estimated vehicle poses, e.g., position and direction of the vehicle that collected/reported the raw sensor data/observation report of the detected feature. The localization algorithm then determines the best pose such that the measurements obtained from the reporting vehicle's sensor, e.g., measurements of the location/position of the detected feature, most agrees with the digital map. In one example embodiment, determining agreement with the map can include but is not limited to determining that the vehicle pose corresponds to the direction or heading of a road link or segment of the digital map. In one embodiment, the localization or registering of sensor data 301 to the digital maps comprises lane-level localization of the detected features. In one example embodiment, lane-level localization refers to registering sensor data to individual lanes of multi-lane road links, e.g., a specific lane of a multi-lane highway, or to an accuracy equivalent to or capable of distinguishing a typical road lane width, e.g., 9-12 feet.

In one embodiment, feature aggregation module 209 can process sensor data e.g., image data and/or map feature observation reports to specific locations represented in the digital map data, collected from vehicles 101 to aggregate the features indicated in sensor data into a feature set. It is contemplated that the aggregation can use any attribute or characteristic of the detected features into the feature set including but not limited to location, e.g., detected features within a predetermined distance threshold are grouped into the feature set, feature type, e.g., detected features of a type of interest, e.g., road signs, can be grouped together, feature attribute, e.g., signs with a triangular shape as an attribute and/or a specified color can be grouped together, and/or any combination thereof. Thereafter, feature aggregation module 209 can cluster the registered features of each drive or reported instance of the aggregated feature set. In one example embodiment, within each feature set, the feature observation reports that are close in space, e.g., within clustering criteria, can be clustered using any clustering technique known in the art, e.g., k-means clustering, DBSCAN clustering, etc., to determine one or more feature clusters, e.g., cluster of feature set. In one embodiment, to perform the clustering, the feature aggregation module 209 can designate default clustering parameters criteria. The clustering parameters can include but are not limited to: a minimum number of feature observations per cluster, distance threshold for a feature observation to be included in a cluster, and/or the like. Additionally, the clustering parameters can be learned directly from data to maximize a predetermined metric. For example, feature aggregation module 209 can require at least three TSR observations that are within a distance threshold, e.g., 15 m, and/or any other specified or learned clustering parameter to create a cluster.

In one embodiment, feature aggregation module 209 can also enforce a minimum number of drives or observations to be collected before completing the aggregation process and proceeding onto subsequent steps by, for instance, determining whether that a count of the individual drives represented in the sensor data is greater than a threshold value. Subsequently, feature aggregation module 209 can determine a consensus set based on or otherwise indicated by feature cluster. In one example embodiment, feature cluster 305 in the aggregate data can show consensus set representing an estimate of the true location of a detected feature corresponding to the feature set. In one embodiment, consensus set, e.g., an estimated or predicted true location of the feature, can be determined based on an overlap of the detected feature locations of feature cluster, e.g., overlap within a threshold distance of each other. The location where the features most overlap, e.g., a centroid of the overlapping features or feature clusters, can then be used as consensus set or estimated true location of the detected feature represented in the feature set. In another embodiment, feature aggregation module 209 can determine at least one feature cluster or feature in feature set being analyzed that does not match the consensus set, and then automatically designate sensor data or feature observation report corresponding to non-matching feature cluster as inaccurate sensor data.

In one embodiment, map update module 211 generates more accurate map updates. In one embodiment, feature aggregation module 209 provides consensus set to map update module 211, whereupon map update module 211 uses the consensus set for the feature set corresponding to a detected feature to determine the true location of the detected feature. In this way, a cluster consensus set can then be used to generate the map update. In one example embodiment, the true location or consensus set can then be used to update the digital map data of the geographic database 107 with an accurate location of the detected feature.

In one embodiment, map update module 211 can provide the processed sensor data or updated digital map to alignment module 213 for use in any number of use cases. Thereafter, alignment module 213 may compare subsequent drive segments to the processed sensor data or updated digital map. Subsequently, alignment module 213 may align subsequent drive segments based on a consensus set of user defined inputs. In one embodiment, the alignment of subsequent drive segments comprises determining a location on the subsequent drive segments that has a similarity to the set of common drive alignment locations, and the similarity is within a threshold similarity. In one embodiment, the similarity is based on a visual similarity. In another embodiment, alignment module 213 may align a location and/or a heading of the subsequent drive segments.

In one embodiment, training module 215 trains machine learning system 113, e.g., a neural network, support vector machine, or equivalent, by obtaining a feature vector or matrix comprising the selected training features from localizer 207, feature aggregation module 209, and alignment module 213. During the training process, training module 215 feeds the feature vectors or matrices of the training dataset into machine learning system 113 to determine a consensus set of user defined inputs, and align one or more drive segments based on a consensus set of user defined inputs. In one example embodiment, training module 215 trains machine learning system 113 to a learning-based approach to map data-storage and retrieval using contextual information priors, e.g., consensus set of user defined inputs. For example, vehicle orientation, vehicle speed, road attributes, road signs, terrain features, drivable surfaces or buildings, etc. can be used as input features for training the machine learning system 113. Specifically, machine learning system 113 is trained to determine a consensus set from user defined inputs that is contextually relevant to a query location, and then align one or more drive segments based on a consensus set of user defined inputs. In order to do so, machine learning system 113 is provided with mapping data, sensor data, user defined inputs, and a query point.

Figure 3:
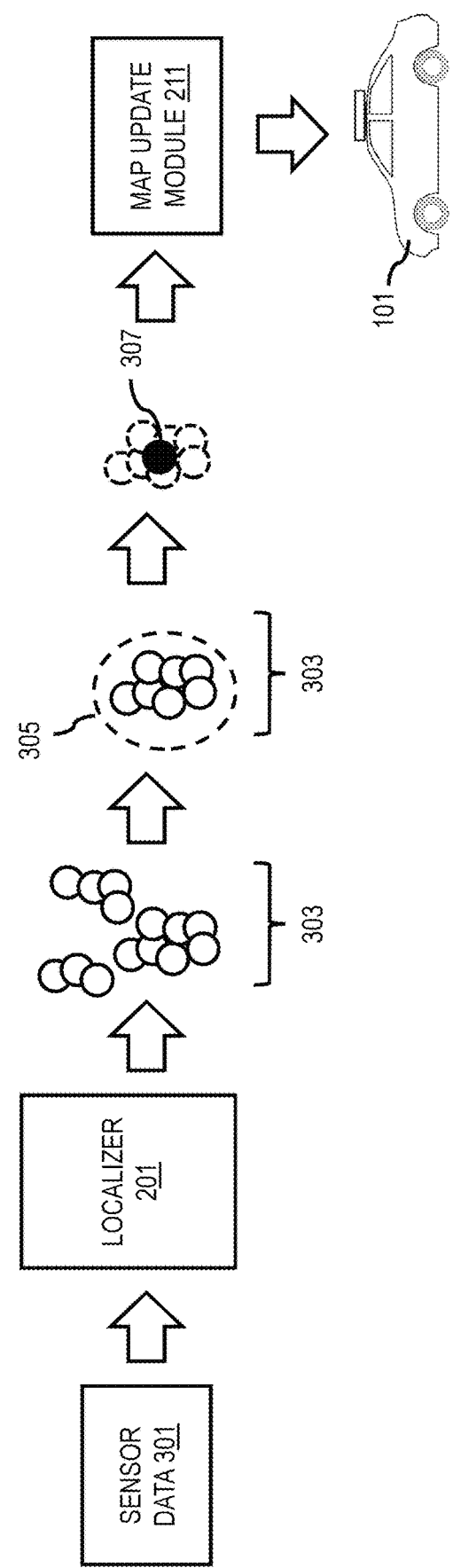
FIG. 3 is a diagram illustrating an example for determining a set of common drive alignment locations for map feature localization, according to one example embodiment.

FIG. 3 is a diagram illustrating an example for determining a set of common drive alignment locations for map feature localization, according to one example embodiment. In one embodiment, for localization, raw sensor data 301, e.g., in the form of GPS location point or trace data, image data, odometry data, etc., is used as an initial estimate for starting a directed search of the geographic database 107 that registers sensor data 301 to the digital map. As discussed above, localizer 207 translates the sensed geographic coordinates for the detected features indicated in sensor data 301 and/or map feature observation reports to specific locations represented in the digital map data. By way of example, localizer 207 can use any localization algorithm or process to register sensor data 301 or reported feature observations to the digital map to determine location data, e.g., geographic coordinates, associated road links/nodes, etc., for the detected features. In one embodiment, the localization or registering of sensor data 301 to the digital map comprises lane-level localization of the detected features.

In one embodiment, each raw sensor data point or observation can correspond to a crowd-sourced drive performed by one or more vehicles 101. In this case, localizer 207 can be run for each drive to register the reported feature detection data to the map, leading to an aggregation of features. For example, feature aggregation module 209 can process sensor data 301 collected from vehicles 101 to aggregate the features indicated in sensor data 301 into a feature set 303.

It is contemplated that feature aggregation module 209 can use any attribute or characteristic of the detected features into the feature set including but not limited to location, e.g., detected features within a predetermined distance threshold are grouped into the feature set, feature type, e.g., detected features of a type of interest, e.g., a road sign, can be grouped together, feature attribute, e.g., signs with a triangular shape as an attribute and/or a specified color can be grouped together, and/or any combination thereof. For example, feature aggregation module 209 can require at least three TSR observations that are within a distance threshold, e.g., 15 m, and/or any other specified or learned clustering parameter to create a cluster 305. Feature aggregation module 209 can then determine a consensus set 307 based on or otherwise indicated by feature cluster 305. For example, feature cluster 305 in the aggregate data can show consensus set 307 representing an estimate of the true location of a detected feature corresponding to the feature set 303. In one embodiment, consensus set 307, e.g., an estimated or predicted true location of the feature, can be determined based on an overlap of the detected feature locations of feature cluster 305, e.g., overlap within a threshold distance of each other such as the threshold corresponding to the diameter of the illustrated circle representing each detected feature. The location where the features most overlap, e.g., a centroid of the overlapping features or feature clusters, can then be used as consensus set 307 or estimated true location of the detected feature represented in feature set 303. In another embodiment, feature aggregation module 209 can determine at least one feature cluster or feature in feature set 303 being analyzed that does not match consensus set 307, and then automatically designate sensor data 301 or feature observation report corresponding to non-matching feature cluster 305 as inaccurate sensor data. In one embodiment, consensus set 307 is stored as a dictionary in geographic database 107 or a memory, and defines the learned human-centric feature spaces relevant to alignment. In such manner, the clustering scheme is used to identify stable regions across a drive segment and eliminate individual bias.

One example function includes but is not limited to generating more accurate map updates. In one embodiment, the map update module 211 uses the consensus set 307 for the feature set 303 corresponding to a detected feature to determine the true location of the detected feature. In this way, cluster consensus set 307 can then be used to generate the map update. For example, the true location or consensus set 307 can then be used to update the digital map data of the geographic database 107 with an accurate location of the detected feature. Mapping platform 111 can then use the processed sensor data 301 for any number of use cases. For example, alignment module 213 may compare subsequent drive segments to determine any misalignment based on consensus set 307. Subsequently, alignment module 213 aligns the location and/or heading of the drive segment to match the consensus set 307.

Figure 4:
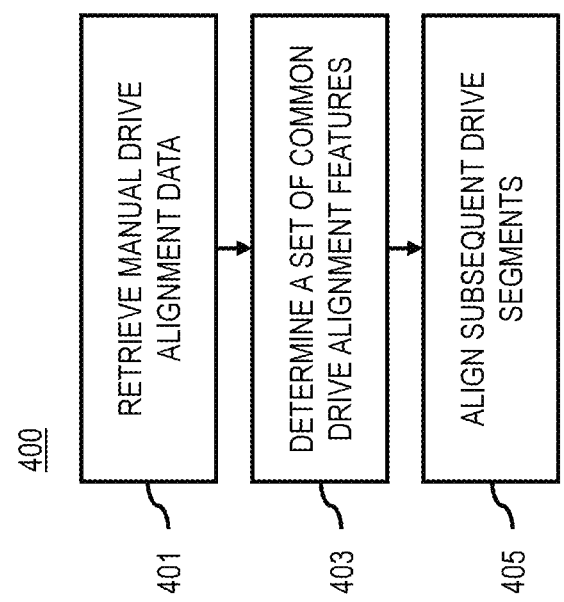
FIG. 4 is a flowchart of a process for aligning one or more drive segments based on a consensus set of user defined inputs, according to one example embodiment.
Figure 10:
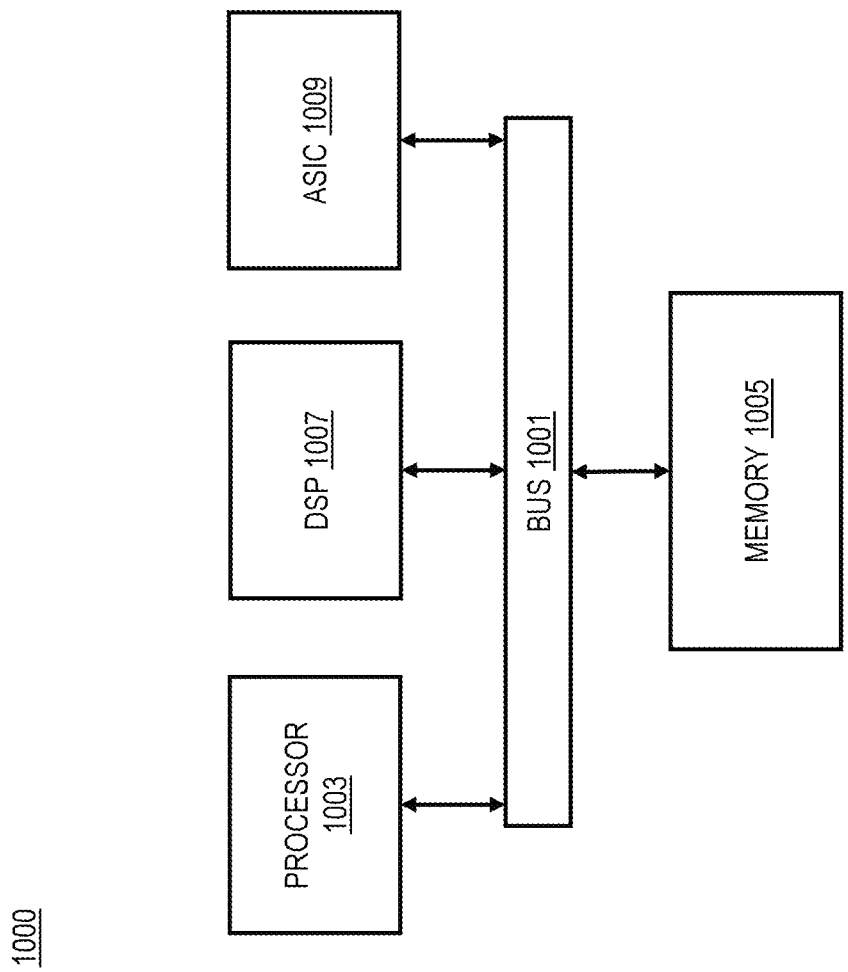
FIG. 10 is a diagram of a chip set that can be used to implement an embodiment of the invention.

FIG. 4 is a flowchart of a process for aligning one or more drive segments based on a consensus set of user defined inputs, according to one example embodiment. In one embodiment, mapping platform 111 performs the process 400 and is implemented in, for instance, a chip set including a processor and a memory as shown in FIG. 10. As such, mapping platform 111 and/or any of its component modules can provide means for accomplishing various parts of process 400, as well as means for accomplishing embodiments of other processes described herein in conjunction with other components of system 100. In addition, embodiments describing functions/actions related to mapping platform 111 individually is equally applicable to the other. Although process 400 is illustrated and described as a sequence of steps, its contemplated that various embodiments of process 400 may be performed in any order or combination and need not include all of the illustrated steps.

In step 401, mapping platform 111 retrieves manual drive alignment data collected from a plurality of human users. In on embodiment, the manual drive alignment data indicates one or more regions of at least one two drive data segments selected by the human users to align the at least one two drive segments.

In step 403, mapping platform 111 processes the manual drive alignment data to determine a set of common drive alignment locations of the one or more regions. In one embodiment, mapping platform 111 clusters one or more regions to identify the set of common drive alignment locations. The set of common drive alignment locations is determined based, at least in part, on a consensus of the one or more regions across the plurality of human users. In one embodiment, the set of common drive alignment locations are used as a learned context-based priors for aligning plurality of subsequent drive segments.

In step 405, mapping platform 111 processes a plurality of subsequent drive segments to automatically align the plurality of subsequent drive segments based on the set of common drive alignment locations. In one embodiment, plurality of subsequent drive segments include vehicle trajectory data and/or image data collected during the plurality of subsequent drive segments. In another embodiment, automatic alignment of the plurality of subsequent drive segments comprises determining a location on the plurality of subsequent drive segments that has a similarity, e.g., a visual similarity, to at least one of the set of common drive alignment locations with a threshold similarity. In one embodiment, aligning of the plurality of subsequent drive segments comprises aligning the vehicle trajectory data and/or the image data. In another embodiment, location that has the similarity is used a point of correspondence between the plurality of subsequent drive segments.

In one embodiment, mapping platform 111 may divide the plurality of subsequent drive segments into a plurality of sub-segments. Thereafter, mapping platform 111 may compare the plurality sub-segments one at a time with the set of common drive alignment locations to align the plurality of subsequent drive segments. In one embodiment, aligning of the plurality of subsequent drive segments comprises aligning a location and/or a heading of the plurality of subsequent drive segments.

In one embodiment, mapping platform 111 may store a set of common drive alignment locations in a memory of a device executing instructions to align the plurality of subsequent drive segments.

Figure 5:
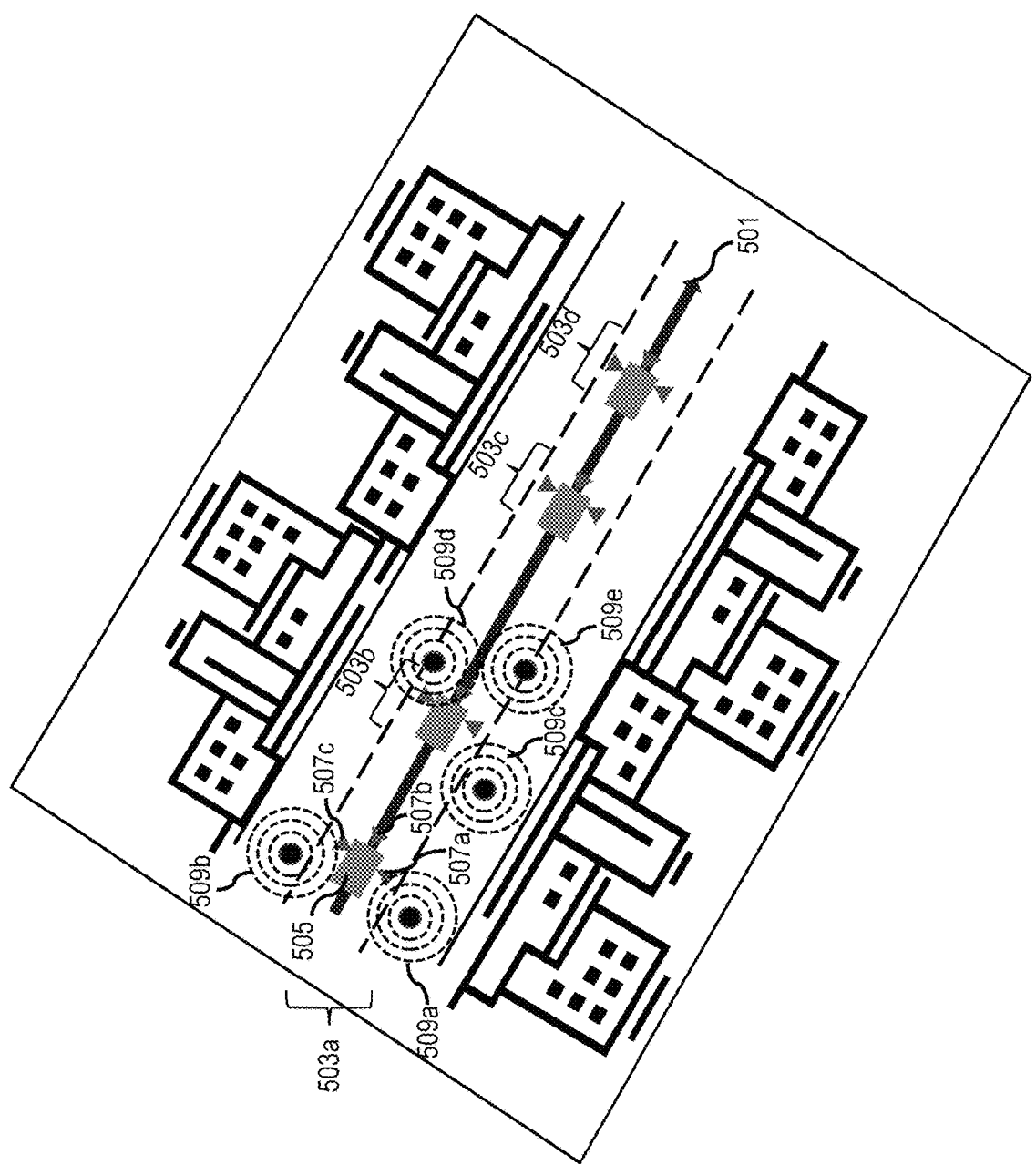
FIG. 5 is a diagram that represent a camera pose trajectory, according to one example embodiment.

FIG. 5 is a diagram that represent a camera pose trajectory, according to one example embodiment. As illustrated, the camera pose trajectory 501 includes a sequence of three probe points 503a-503d respectively indicating the position and heading of vehicle 505 on which three cameras 507a-507c are mounted so that camera 507a points directly to the right of the vehicle 505, camera 507b points directly to the front of the vehicle 505, and camera 507c points directly to the left of the vehicle 505. Therefore, the heading of vehicle 505 can be used to determine the individual headings or pointing directions of the cameras 507a-507c. In one embodiment, the camera mounting location and directions can be stored as metadata associated with camera pose trajectory 501. Alternatively, camera pose trajectory 501 can indicate a vehicle type or classification from which the number and mounting directions of the vehicle's cameras can be determined.

In this example embodiment, the concentric rings around each of the identified features 509a-509e represent their respective spheres of visibility. The camera poses or pointing directions of the cameras 507a-507c can then be evaluated to determine whether they fall with the spheres of visibility. As depicted, at the location of probe point 503a, cameras 507a and 507c fall within the sphere of visibility for features 509a and 509b, respectively. At probe point 503b, cameras 507b and 507c falls within the sphere of visibility of feature 509d. These identified camera poses on the trajectory can then be used for determining which ground level images to process for feature correspondence. It is contemplated that the pose selection module 203 can use any means for determining the sphere of visibility including but not limited to using a default radius, e.g., 20 meters, from the location of the identified semantic feature. In one embodiment, the pose selection module 203 can compute the estimated physical volume based on a map data of the area of interest. For example, the pose selection module 203 can use mapped street features, 3D models of nearby buildings/structures, and/or the like stored in the digital map of the geographic database 107 to compute lines of sight from the trajectory 501 to each identified feature. The spheres of visibility can then be based on the computed lines of sight.

FIG. 6 illustrates examples of a set of top down images 601 from a first source, e.g., an aerial source such as a satellite 109, and a set of ground level images 603 from a second source, e.g., a ground level source such as a camera mounted on a vehicle 101 or a UE 103. In this example embodiment, top down images 601 and ground level images 603 depict the same map or semantic feature 605, e.g., a crosswalk corner formed by the joining of two lines of a crosswalk painted in an intersection. By way of example, top down imagery refers to images or image data that are captured from an overhead or aerial perspective so that the camera is pointed down towards the intersection or ground level from an overhead height. Ground-level imagery refers to images or image data captured while the camera is located at ground level or mounted on a vehicle or system that is located at ground level with the camera pointed towards the feature or object being captured.

In one embodiment, by knowing the camera model or pose, e.g., camera position, mount axis, pointing direction, field of view, focal length, etc., the pixel location of feature 605 as depicted in each of images 601 and 603 can be translated to a real-world or ground location, e.g., expressed a geocoordinates comprising <latitude, longitude, elevation>. In other words, the known geolocation of the camera, e.g., camera latitude, longitude, elevation, can be used to translate the pixel location of feature 605 in the image to real-world coordinates, e.g., the image-to-ground correspondence of feature 605. Therefore, the accuracy of the location of the camera directly determines the accuracy of the image-to-ground correspondence of the feature 605. The location of the camera is generally determined using location sensors of the system or component on which the camera is mounted, e.g., vehicle 101, UE 103, satellite 109. This variability in camera pose or camera model accuracy, in turn, can result in the images from each source having different location accuracy. For example, top down images 601 may have higher location accuracy or fidelity than ground level images 603 because the satellites 109 used to capture the top down images 601 typically have more accurate location sensors than ground level components, e.g., vehicle 101 and UE 103, used for capturing the ground level images 603.

Figure 7B:
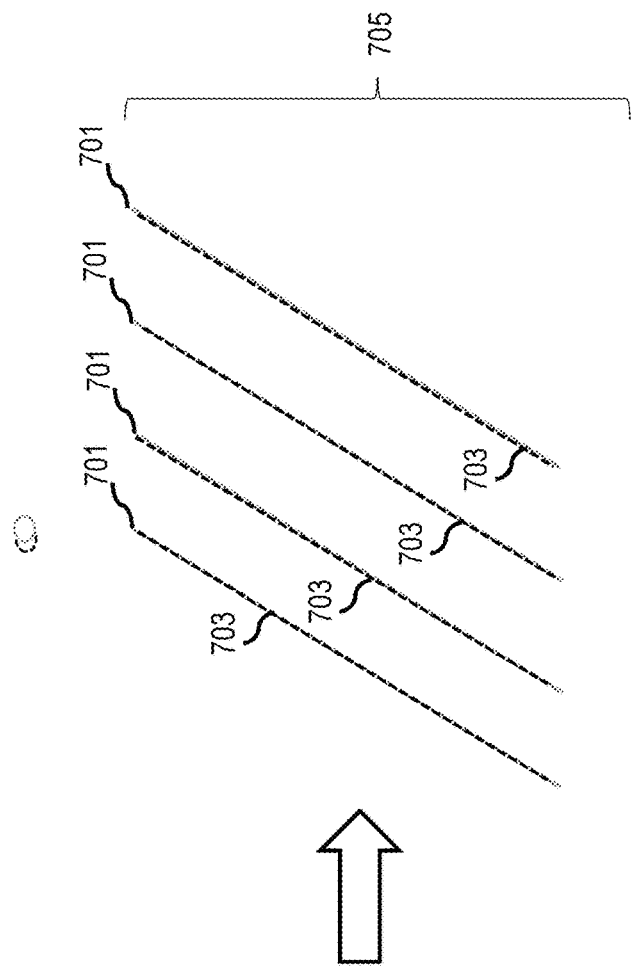
FIGS. 7A and 7B are diagrams that represent an alignment of drive segments. according to one example embodiment.
Figure 7A:
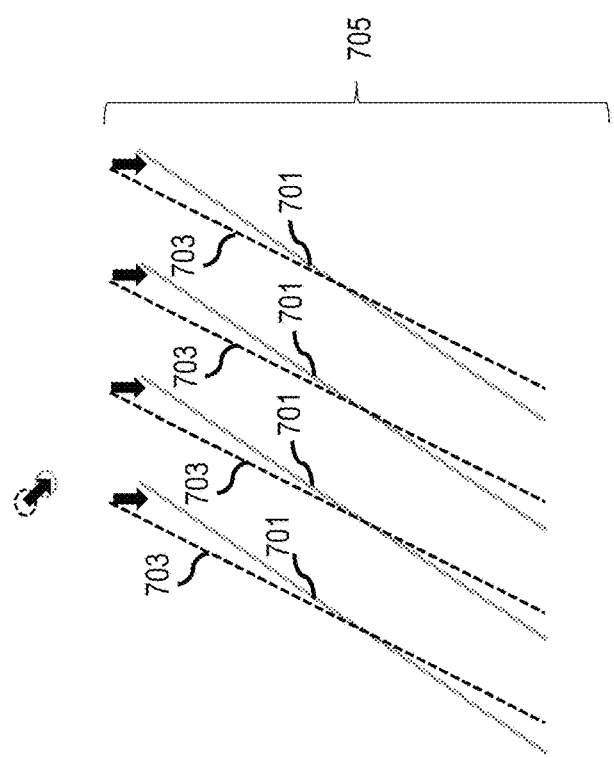

FIGS. 7A and 7B are diagrams that represent an alignment of drive segments. according to one example embodiment. Referring to FIG. 7A, a local misalignment between two drive segments is depicted. As illustrated, line 701 represents an individual drive segment of a plurality of human users in location 705. Mapping platform 111 retrieves manual drive alignment data, e.g., regions of drive data segments of location 705 selected by the human users to align, from the plurality of human users. Thereafter, mapping platform 111 processes the manual drive alignment data to determine a set of common drive alignment regions, e.g., consensus set, for location 705, e.g., one or more stable regions in location 705. Subsequently, mapping platform 111 processes the plurality of subsequent drive segments, e.g., line 703, to determine any misalignment based, at least in part, on the set of common drive alignment regions. In one embodiment, mapping platform 111 may use the set of common drive alignment locations as a learned context-based priors for the aligning subsequent drive segments. In one example embodiment, for new pair of drive segments that needs to be aligned, mapping platform 111 compares the drive segments to the set of common drive alignment regions stored in a memory, and the regions in the drive segment that correspond to visually similar locations are used as points of correspondence. Thereafter, mapping platform 111 aligns a location and/or a heading of drive segments 703 to drive segments 701, as illustrated in FIG. 7B. In FIG. 7B, a correct alignment is obtained by mapping platform 111 as a result of leaning to implicitly align data from user-defined inputs, e.g., a user clicked point of correspondence, without the need to define an explicit alignment metric, e.g., iterative closest point. In a further embodiment, mapping platform 111 may divide subsequent drive segment 703 into sub-segments, and then compare the sub-segments one at a time with the set of common drive alignment locations of drive segments 701 to align the subsequent drive segment 703.

Figure 8:
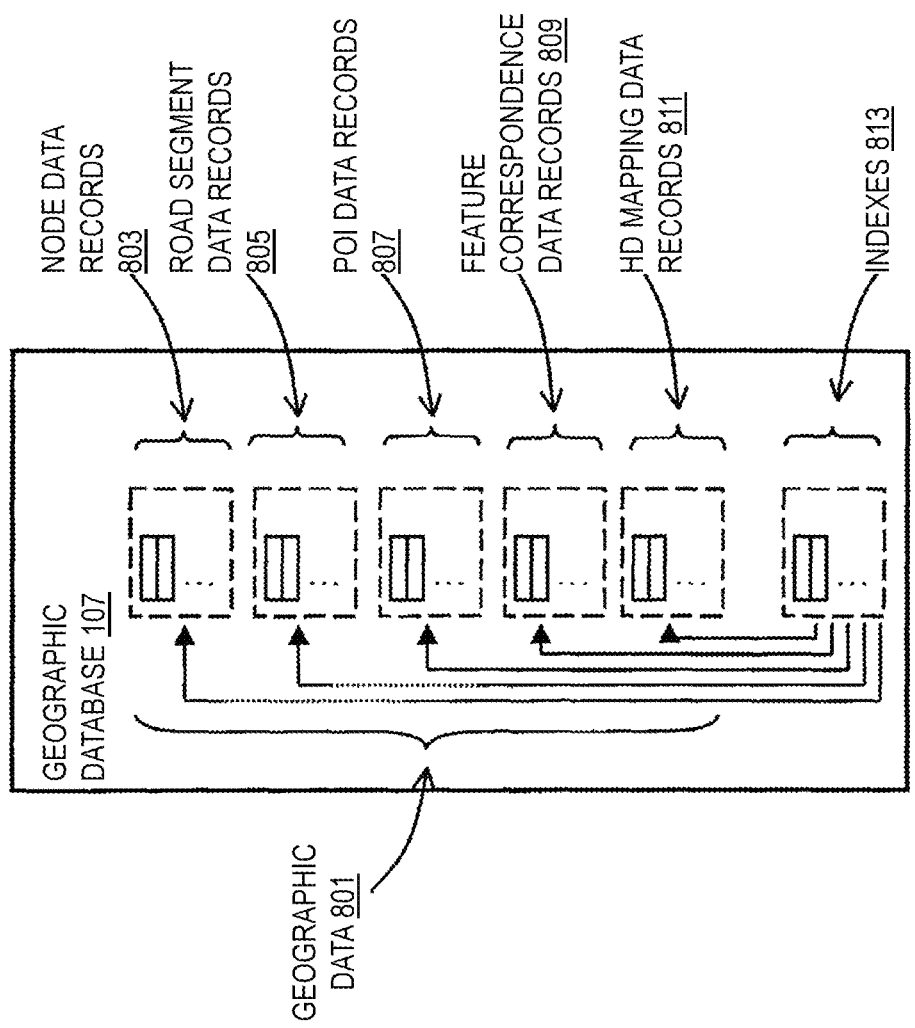
FIG. 8 is a diagram of a geographic database, according to one embodiment.

FIG. 8 is a diagram of a geographic database, according to one embodiment. In one embodiment, the geographic database 107 includes geographic data 801 used for (or configured to be compiled to be used for) mapping and/or navigation-related services, such as for video odometry based on the mapped features (e.g., lane lines, road markings, signs, etc.). In one embodiment, the geographic database 107 includes high resolution or high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, the HD mapping data (e.g., HD mapping data records 811) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 107.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 107 follows certain conventions. For example, links do not cross themselves and do not cross each other except at a node. Also, there are no duplicated shape points, nodes, or links. Two links that connect each other have a common node. In the geographic database 107, overlapping geographic features are represented by overlapping polygons. When polygons overlap, the boundary of one polygon crosses the boundary of the other polygon. In the geographic database 107, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 107 includes node data records 803, road segment or link data records 805, POI data records 807, feature correspondence data records 809, HD mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 107. In one embodiment, the indexes 813 may be used to quickly locate data without having to search every row in the geographic database 107 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 107 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 107 can include data about the POIs and their respective locations in the POI data records 807. The geographic database 107 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 107 can also include feature correspondence data records 809 for storing the identified feature correspondences (e.g., image-to-image correspondences, image-to-ground correspondences, the location of a point of interest (POI) or region selected by users to identify corresponding points across drives, etc.), location corrected images, location corrected features, location corrected camera models/poses, as well as other related data used or generated according to the various embodiments described herein. By way of example, the feature correspondence data records 809 can be associated with one or more of the node data records 803, road segment data records 805, and/or POI data records 807 to support localization or visual odometry based on the features stored therein and the corresponding estimated quality of the features. In this way, the feature correspondence data records 809 can also be associated with or used to classify the characteristics or metadata of the corresponding records 803, 805, and/or 807.

In one embodiment, as discussed above, the HD mapping data records 811 model road surfaces and other map features to centimeter-level or better accuracy. The HD mapping data records 811 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 811 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 107 can be maintained by the content provider 127 in association with the services platform 119 (e.g., a map developer). The map developer can collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 103) along roads throughout the geographic region to observe features and/or record information about them, for example. Also, remote sensing, such as aerial or satellite photography, can be used.

The geographic database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for aligning one or more drive segments based on a consensus set of user defined inputs may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
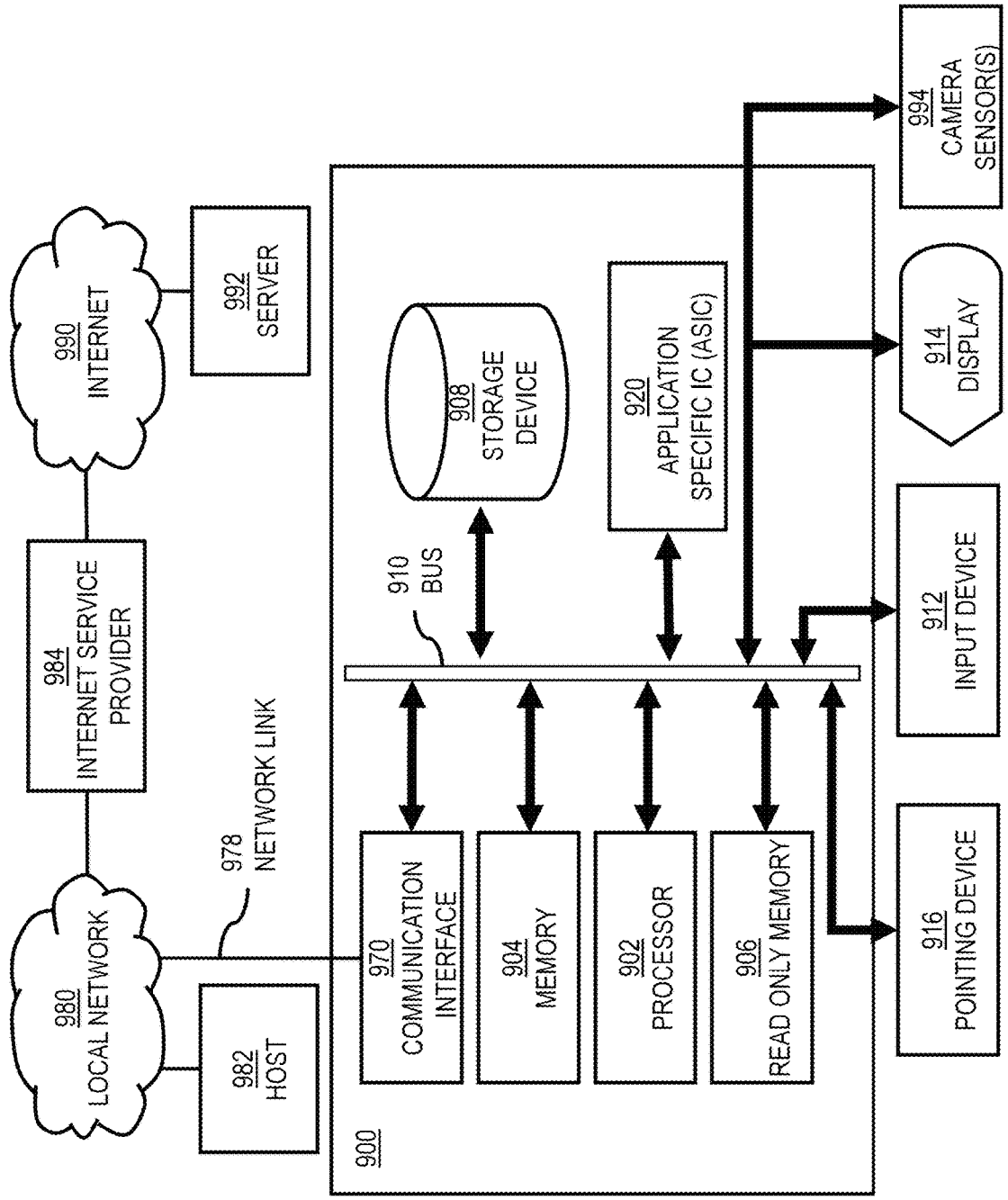
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to align one or more drive segments based on a consensus set of user defined inputs as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of aligning one or more drive segments based on a consensus set of user defined inputs.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to aligning one or more drive segments based on a consensus set of user defined inputs. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for aligning one or more drive segments based on a consensus set of user defined inputs. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for aligning one or more drive segments based on a consensus set of user defined inputs, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet.

Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 125 for aligning one or more drive segments based on a consensus set of user defined inputs to the vehicle 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to align one or more drive segments based on a consensus set of user defined inputs as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of aligning one or more drive segments based on a consensus set of user defined inputs.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to align one or more drive segments based on a consensus set of user defined inputs. The memory 1005 also stores the data associated with or generated by the execution of the inventive steps.

Figure 11:
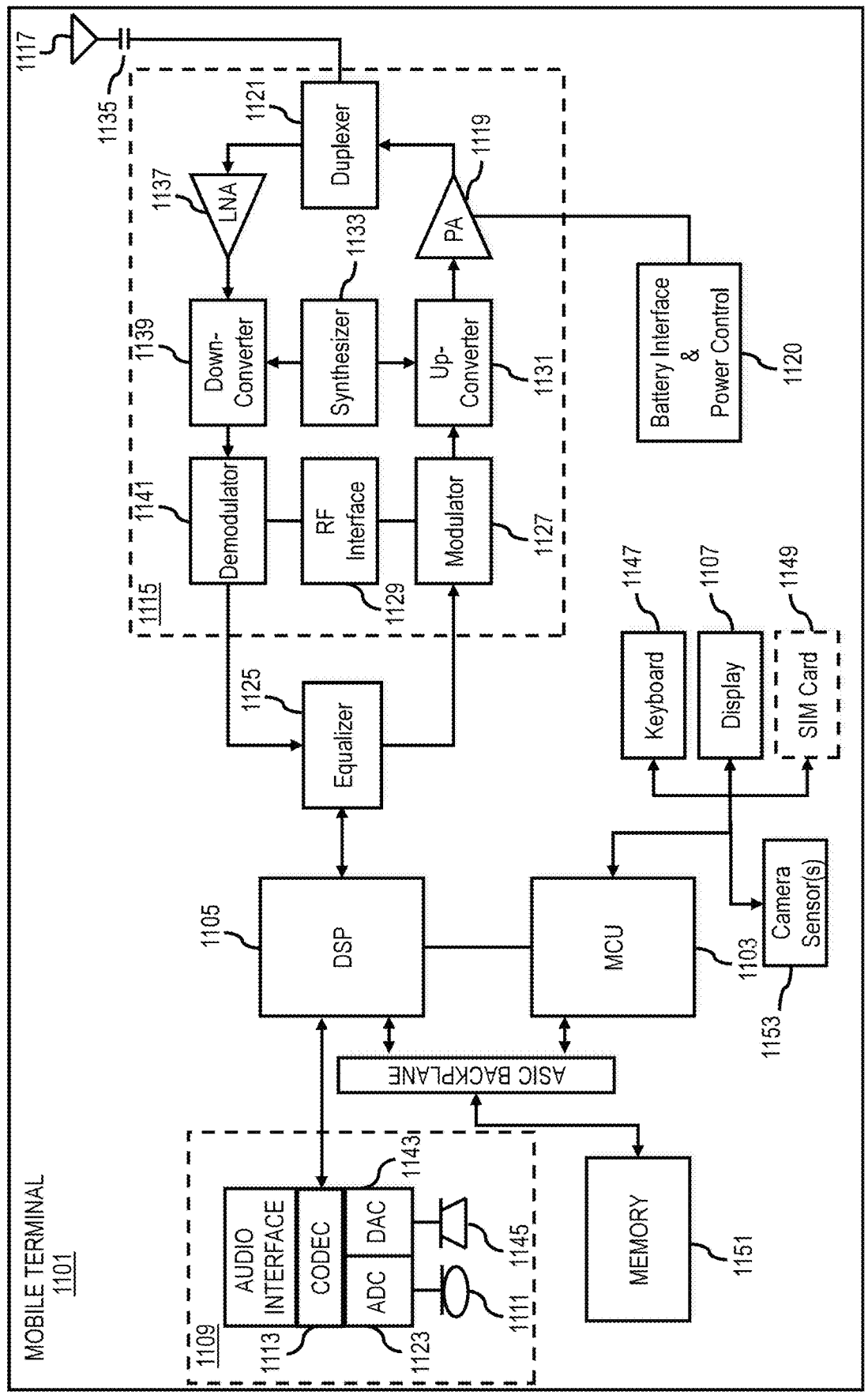
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of aligning one or more drive segments based on a consensus set of user defined inputs. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of aligning one or more drive segments based on a consensus set of user defined inputs. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to align one or more drive segments based on a consensus set of user defined inputs. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
retrieving manual drive alignment data collected from a plurality of human users, wherein the manual drive alignment data indicates one or more regions of at least two drive data segments selected by the human users to align the at least two drive segments;
processing the manual drive alignment data to determine a set of common drive alignment locations of the one or more regions;
processing a plurality of subsequent drive segments to automatically align the plurality of subsequent drive segments based on the set of common drive alignment locations; and
providing the aligned plurality of subsequent drive segments as an output to a device to localize a vehicle.

2. The method of claim 1, further comprising:
clustering the one or more regions to identify the set of common drive alignment locations.

3. The method of claim 1, wherein the set of common drive alignment locations is determined based on a consensus of the one or more regions across the plurality of human users.

4. The method of claim 1, wherein the automatic alignment of the plurality of subsequent drive segments comprises determining a location on the plurality of subsequent drive segments that has a similarity to at least one of the set of common drive alignment locations with a threshold similarity.

5. The method of claim 4, wherein the similarity is based on a visual similarity.

6. The method of claim 4, wherein location that has the similarity is used as a point of correspondence between the plurality of subsequent drive segments.

7. The method of claim 1, wherein the set of common drive alignment locations is used as a learned context-based priors for the aligning of the plurality of subsequent drive segments.

8. The method of claim 1, further comprising:
dividing the plurality of subsequent drive segments into a plurality of sub-segments; and
comparing the plurality of sub-segments one at a time with the set of common drive alignment locations to align the plurality of subsequent drive segments.

9. The method of claim 1, further comprising:
storing the set of common drive alignment locations in a memory of the device executing instructions to align the plurality of subsequent drive segments.

10. The method of claim 1, wherein the plurality of subsequent drive segments includes vehicle trajectory data, image data collected during the plurality of subsequent drive segments, or a combination thereof; and wherein the aligning of the plurality of subsequent drive segments comprises aligning the vehicle trajectory data, the image data, or a combination thereof.

11. The method of claim 1, wherein the aligning of the plurality of subsequent drive segments comprises aligning a location, a heading, or a combination thereof of the plurality of subsequent drive segments.

12. An apparatus comprising:
at least one processor; and
at least one memory including computer program code for one or more programs,
the at least one memory and the computer program code configured to, with the at least one processor, cause the apparatus to perform at least the following,
retrieve manual drive alignment data collected from a plurality of human users, wherein the manual drive alignment data indicates one or more regions of at least one drive data segment selected by the human users to align the at least two drive segments;
process the manual drive alignment data to determine a set of common drive alignment locations of the one or more regions;
process a plurality of subsequent drive segments to automatically align the plurality of subsequent drive segments based on the set of common drive alignment locations; and
provide the aligned plurality of subsequent drive segments as an output to a device to localize a vehicle.

13. The apparatus of claim 12, wherein the apparatus is further caused to:
cluster the one or more regions to identify the set of common drive alignment locations.

14. The apparatus of claim 12, wherein the set of common drive alignment locations is determined based on a consensus of the one or more regions across the plurality of human users.

15. The apparatus of claim 12, wherein the automatic alignment of the plurality of subsequent drive segments comprises determining a location on the plurality of subsequent drive segments that has a similarity to at least one of the set of common drive alignment locations with a threshold similarity.

16. The apparatus of claim 15, wherein the similarity is based on a visual similarity.

17. The apparatus of claim 15, wherein the location that has the similarity is used as a point of correspondence between the plurality of subsequent drive segments.

18. A non-transitory computer-readable storage medium carrying one or more sequences of one or more instructions which, when executed by one or more processors, cause an apparatus to perform:
retrieving manual drive alignment data collected from a plurality of human users, wherein the manual drive alignment data indicates one or more regions of at least two drive data segments selected by the human users to align the at least two drive segments;
processing the manual drive alignment data to determine a set of common drive alignment locations of the one or more regions;
processing a plurality of subsequent drive segments to automatically align the plurality of subsequent drive segments based on the set of common drive alignment locations; and
providing the aligned plurality of subsequent drive segments as an output to a device to localize a vehicle.

19. The non-transitory computer-readable storage medium of claim 18, wherein the apparatus is further caused to perform:
clustering the one or more regions to identify the set of common drive alignment locations.

20. The non-transitory computer-readable storage medium of claim 18, wherein the set of common drive alignment locations is determined based on a consensus of the one or more regions across the plurality of human users.

* * * * *